F. CONTENTI.
MEASURING DEVICE.
APPLICATION FILED APR. 1, 1911.
1,000,151.
Patented Aug. 8, 1911.
2 SHEETS—SHEET 1.
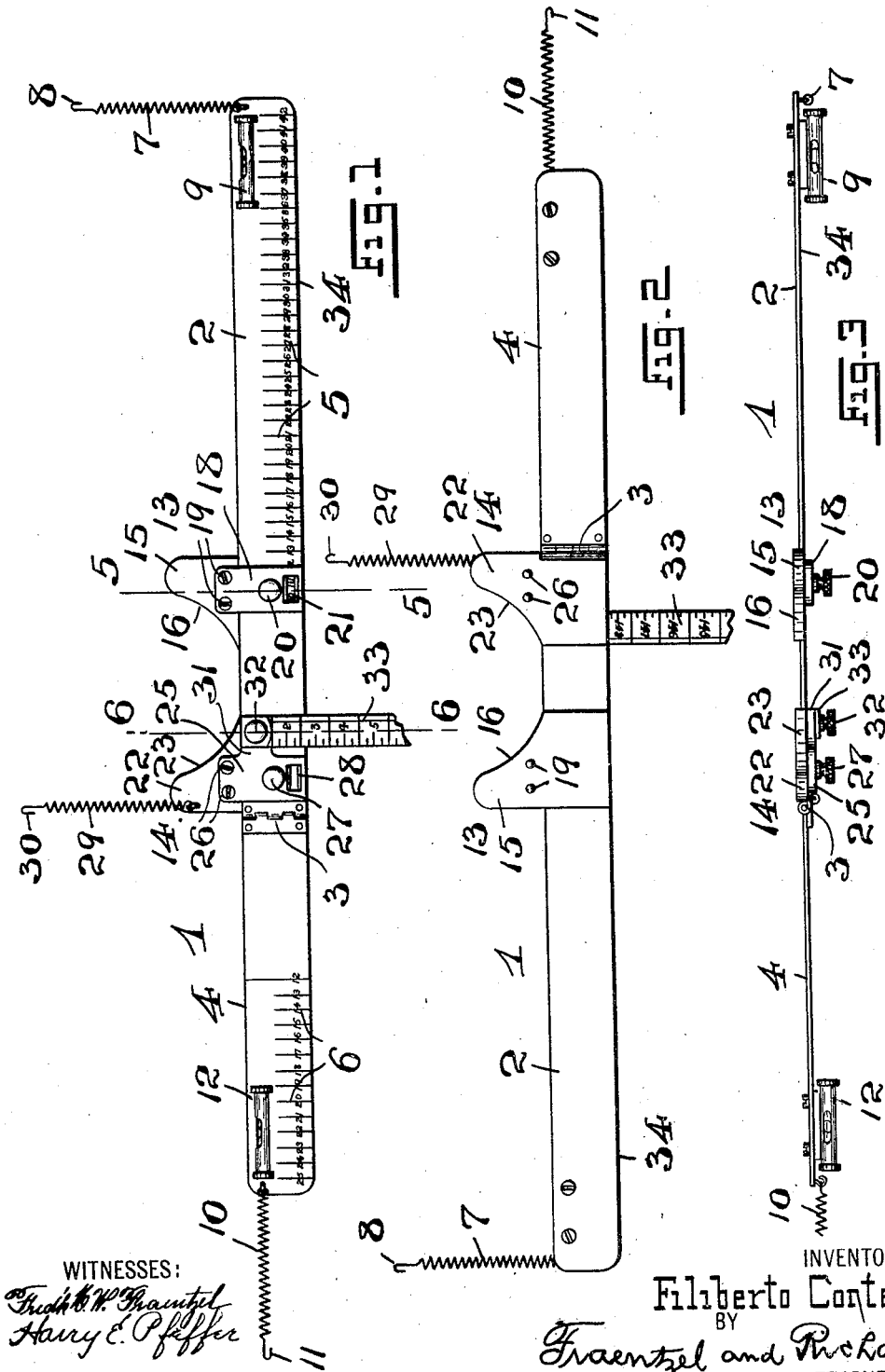
WITNESSES:
INVENTOR:
Filiberto Contenti,
BY
Fraentzel and Richards,
ATTORNEYS

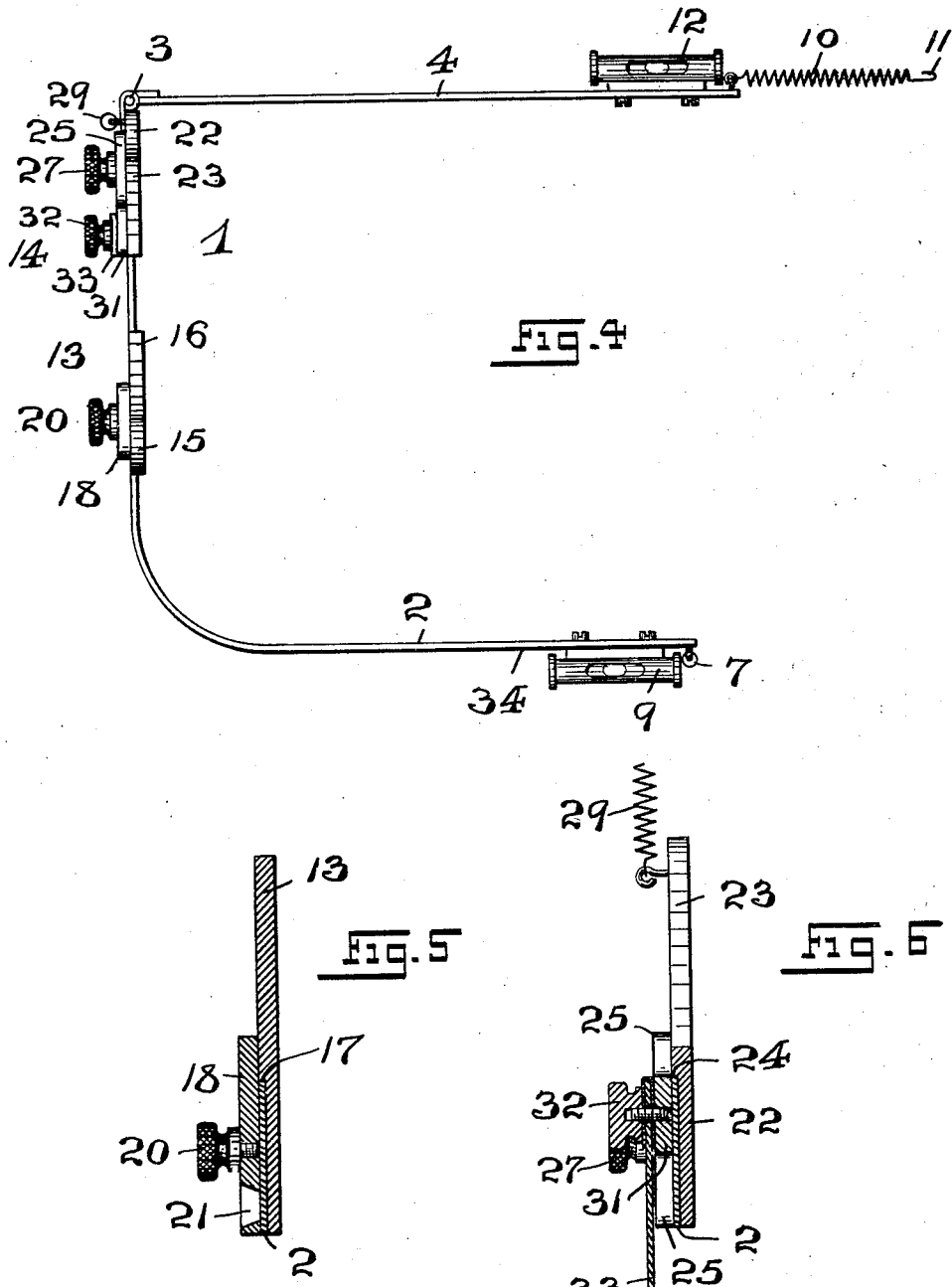

UNITED STATES PATENT OFFICE.

FILIBERTO CONTENTI, OF NEWARK, NEW JERSEY.

MEASURING DEVICE.

1,000,151.  Specification of Letters Patent.  Patented Aug. 8, 1911.

Application filed April 1, 1911. Serial No. 618,383.

*To all whom it may concern:*

Be it known that I, FILIBERTO CONTENTI, a subject of King of Italy, residing at Newark, in the county of Essex and State of New Jersey, have invented certain new and useful Improvements in Measuring Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in measuring devices; and, the present invention relates, more particularly to a novel and simply constructed implement for use as a tailor's measure, the measuring device or implement being made from flexible and resilient sheet-metal, usually steel, which adapts itself, upon taking the measurements of a person, approximately to the shape or contour of the part of the body upon which measurements are taken, and the device being further provided with an auxiliary arm or member which is pivotally connected with the main member or element of the measuring device, the said auxiliary arm or member, in taking chest-measurements being adapted to lie directly upon or against the chest of the body, while the main member or element lies partly upon or against the back of the body and is bent or curved beneath the arm of the person, so as to extend forwardly and in front of the chest of the person being measured.

This invention, therefore, has for its principal object to provide a novel measuring implement or device for the use of tailors, dressmakers, and designers of garments, such measuring implement, as has been stated, being made from flexible or resilient sheet-metal, as steel, so as to adapt itself readily to the contour of the body; and, furthermore, to provide a tailor's measure comprising the hinged or pivoted members, in the manner above stated, and other novel features, all of which will hereinafter more fully appear.

With the various objects of the present in view, the said invention consists, primarily, in the novel measuring device or implement hereinafter set forth; and, the said invention consists, furthermore, in the novel arrangements and combinations of the several parts, as well as in the details of the construction of the same, all of which will be more fully described in the following specification, and then finally embodied in the clauses of the claim which are appended to and which form an essential part of this specification.

The invention is illustrated in the accompanying drawings, in which:—

Figure 1 is a front view and Fig. 2 is a rear view of a tailor's measuring device or implement, showing one embodiment of the principles of the present invention; and Fig. 3 is a top-edge view of the same. Fig. 4 is a similar view of the device, showing the general relation of the parts in taking chest-measurements. Fig. 5 is a transverse vertical section taken on line 5—5 in said Fig. 1; and Fig. 6 is a similar section taken on line 6—6 in said Fig. 1.

Similar characters of reference are employed in all of the above described views, to indicate corresponding parts.

Referring now to the several figures of the drawings, the reference-character 1 indicates a complete measuring implement or device made according to and embodying the principles of the present invention. The said measuring implement or device consists of a main body-member or element 2 with which is pivotally connected by means of a hinge 3, or other suitable connection, an arm or member, as 4, said member or element 2 being provided with suitable graduations providing a scale 5, and the said arm or member 4 being also provided with suitable graduations providing a scale 6. The said main member or element 2 is preferably provided at its free end-portion with a spring 7, having formed upon its free end a fastening means, such as a hook 8, and upon the face of said member or element 2 there is secured a level, as 9. In like manner, the said member or arm 4 is preferably provided at its free end-portion with a spring 10, having formed upon its free end a fastening means, such a hook 11, and upon the face of said member or arm 4 there is secured a level, as 12.

Adjustably mounted and secured upon the said main member or element 2 are a pair of arm-gages 13 and 14, the gage 13 consisting of a main body or plate 15, formed with a concave marginal edge-portion 16 and an off-set portion 17 for suitably fitting the said plate 15 upon the said main member or element 2, substantially in the manner illustrated in Fig. 5 of the drawings. That the said gage 13 may be slidably arranged and positively fixed in its adjusted position upon said main member or element 2, a face-plate 18 is provided which is suitably secured upon the front face of the said plate 15 by suitable fastening means, preferably screws 19, and has a portion adapted to be brought into binding or holding engagement with the front face of said main member or element 2, preferably by means of a suitably constructed binding screw, as 20. If desired, the said front or face-plate 18 may be formed with a reading opening 21. By slightly unscrewing the said binding screw 20, the said gage 13 may be moved laterally upon said main member or element 2, or entirely removed therefrom, as will be clearly evident. The other gage 14 also consists of a main body or plate 22, formed with a concave marginal edge-portion 23 and an off-set portion 24 for suitably fitting the said plate 22 upon the said main member or element 2, substantially in the manner represented in Fig. 6 of the drawings. That the said gage 14 may be slidably arranged and positively fixed in its adjusted position upon said main member or element 2, a face-plate 25 is provided which is suitably secured upon the front face of said plate 22 by suitable fastening means, as screws 26, and has a portion adapted to be brought into binding or holding engagement with the front face of said main member or element 2, preferably by means of a suitably constructed binding screw, as 27. The said front or face-plate 22 may also be formed with a reading opening 28, if desired. By slightly unscrewing the said binding screw 27, the said gage 14 may be moved laterally upon said main member or element 2, or entirely removed therefrom, if desired. Suitably secured to the said main body or plate 22 of the gage 14 is a coiled spring 29 having formed upon its free end a means of suspension, such as a hook 30, the purpose of which will be presently more fully specified. Suitably secured to an extension, as 31, or other suitable part of the front or face-plate 25 by means of a screw, as 32, or other means of attachment, is a downwardly extending tape-measure 33 which is to be used for taking length or depth-measurements, in addition to the width or breadth-measurements which are taken by means of the implement or device comprising the two members or elements 2 and 4.

Having in the foregoing set forth in a manner the general construction of the tailors' measuring implement or device, I will now briefly set forth one manner of using the same in taking measurements.

Having properly adjusted the two gages 13 and 14 upon the main member or element 2, so that they will properly fit under the arm of the person, the said member or element 2 is bent, substantially in the manner shown in Fig. 4 of the drawings, so that the portion 34 of the member or element 2 can be fitted against the back of the person, said portion 34 being brought into its level relation by means of the level 9, and then suspended or secured in its fastened position by securing the hook 8 of the spring 7 in the garment worn by the person. At the same time, the hook 30 of the spring 29 is also fastened in the front of the garment at a point near the arm of the person. The member or arm 4 of the measuring device or implement is then turned at an angle, usually at a right angle, to the bent member or element 2, the said member or arm 4 being arranged directly against the front of the person, said member or arm 4 being brought into its level relation by means of the level 12, and then suspended or secured in its fastened position by securing the hook 11 of the spring 10 in the garment. The breadths of the back and front are then read from the scales of the respective members 2 and 4 in the usual manner. The depth of the garment is read from the tape-measure 33, as will be clearly evident.

From the foregoing description of my present invention, it will be seen that I have devised a simply constructed and easily manipulated measuring device, which can be readily applied, and which can be used for coat and trouser-measurements, or for the measurements of other wearing apparel.

I am aware that some changes may be made in the general arrangements and combinations of the devices and parts of the measuring implement without departing from the scope of the present invention as set forth in the foregoing specification and as defined in the claims which are appended thereto. Hence, I do not limit my invention to the exact arrangements and combinations of the said devices and parts as described in the said specification, nor do I confine myself to the exact details of the construction of the said parts, as illustrated in the accompanying drawings.

I claim:—

1. A tailor's measuring device comprising a measuring element, said element being made from flexible sheet-metal so as to be capable of being bent to conform to the contour of the body, a spring secured to said element at each end thereof, and a fastening hook connected with each spring for its attachment to a garment, substantially as and for the purposes set forth.

2. A tailor's measuring device comprising a measuring element, said element being made from flexible sheet-metal so as to be capable of being bent to conform to the contour of the body, a level mounted upon said element, a spring secured to each element at each end thereof, and a fastening hook connected with said spring for its attachment to a garment, substantially as and for the purposes set forth.

3. A tailor's measuring device comprising a main measuring element, an auxiliary measuring arm, a means of pivotal connection between said main measuring element and said auxiliary measuring arm, said main measuring element and said auxiliary measuring arm being made from flexible sheet metal so as to be capable of being bent to conform to the contour of the body, gages slidably and adjustably connected with said main measuring element, means connected with said gages for securing said gages in their adjusted positions, springs secured to said main measuring element and said auxiliary measuring arm, and a fastening hook connected with each spring for its attachment to a garment, and a tape-measure connected with and suspended from one of said gages, substantially as and for the purposes set forth.

In testimony, that I claim the invention set forth above I have hereunto set my hand this 21st day of March, 1911.

FILIBERTO CONTENTI.

Witnesses:
FREDK. C. FRAENTZEL,
FREDK. H. W. FRAENTZEL.

---

Copies of this patent may be obtained for five cents each, by addressing the "Commissioner of Patents, Washington, D. C."